Patented Dec. 15, 1931

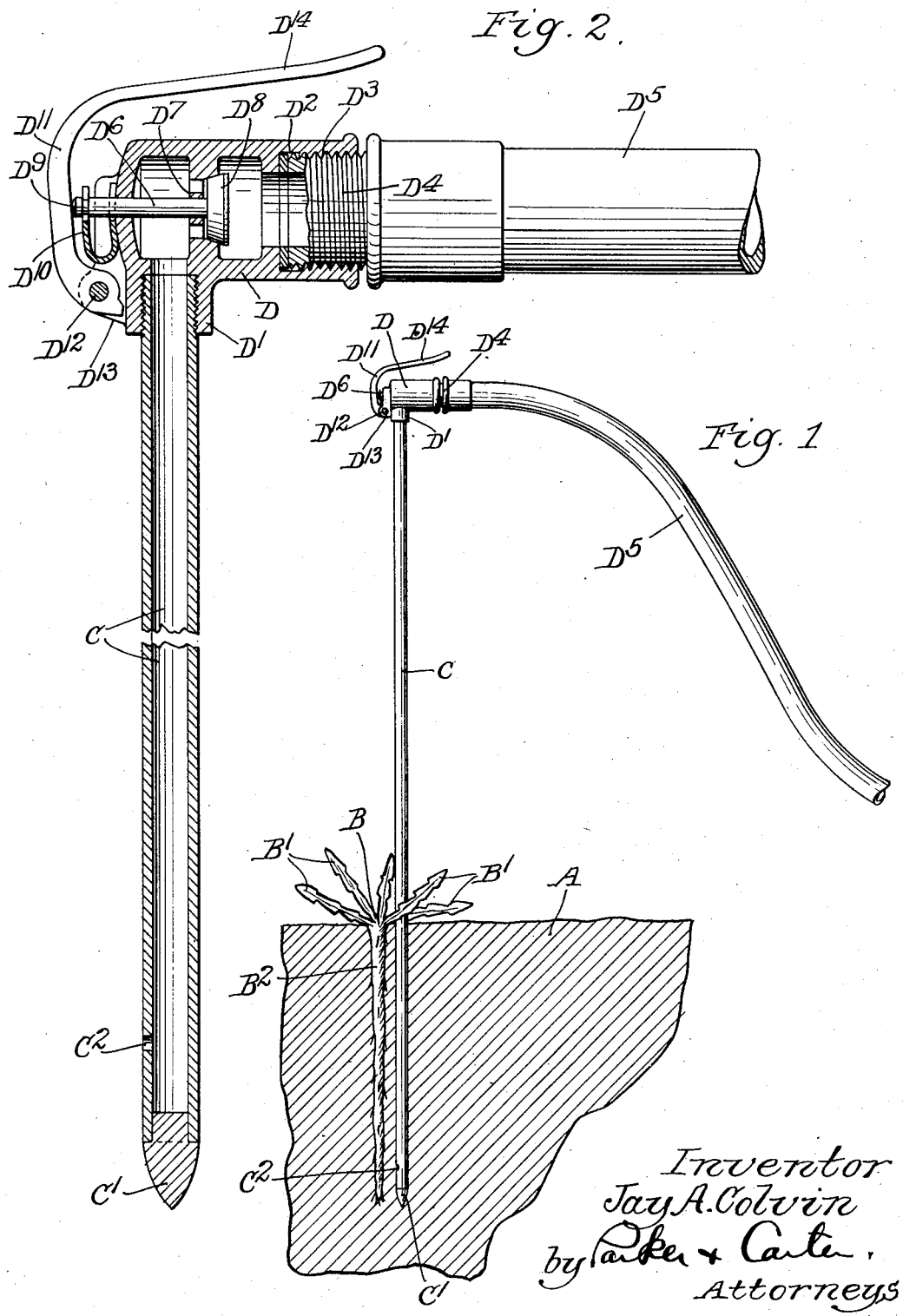

1,836,449

UNITED STATES PATENT OFFICE

JAY A. COLVIN, OF CHICAGO, ILLINOIS

METHOD OF REMOVING PLANTS, WEEDS AND THE LIKE

Application filed August 8, 1930. Serial No. 473,857.

This invention relates to removal of weeds and plants from the soil. It has for one object to provide a method by means of which plants and particularly their roots may be completely removed from the ground in which they are growing. Another object is to provide a method for removing plants without disfiguring or disturbing surrounding ground. Another object is to provide a method for removing plants without cutting. Other objects will appear from time to time in the specification and claims.

The invention is illustrated more or less diagrammatically in the accompanying drawings, wherein;

Figure 1 is a side elevation with parts in section illustrating the removal of a weed; and Fig. 2 is a sectional view on an enlarged scale showing the tool for carrying out my method.

Like parts are designated by like characters throughout.

A indicates the soil in which a weed or other plant is growing. B is the plant. $B^1$, $B^1$ are the leaves of the plant. $B^2$ is a root. The working tool includes a tubular member C which is preferably closed at its lower end as at $C^1$ and is provided with a perforation or outlet $C^2$. While I have shown but a single perforation and while for most purposes this is satisfactory, it is within the contemplation of my invention to use a plurality of perforations or outlets where that proves advisable.

The tubular member C is threaded or otherwise fastened to a valve housing D. In the form here shown that housing is provided with an interiorly threaded extension $D^1$ into which the open end of the tube C is threaded. At its other end the housing D is provided with a larger opening $D^2$ which is interiorly threaded as at $D^3$ to engage a mating threaded member $D^4$, which is secured to a hose or similar liquid conduit $D^5$ which may be attached to a suitable supply of water or other liquid.

Positioned within the housing D is a valve stem $D^6$ which is slidably mounted at one end in a wall of the housing and adjacent its other end in a spider $D^7$. The stems $D^6$ carries a valve member $D^8$ which is adapted to be seated in a seat within the housing as indicated in Fig. 2, and when seated to prevent passage of liquid from the hose through the housing and into the tube C. The stem $D^6$ is reduced or cut away adjacent its outer end as at $D^9$ and about the reduced portion, one end of a spring $D^{10}$ is positioned. The opposite end of the spring bears upon the housing D. The spring tends to move the valve and valve stem to the left as indicated in Fig. 2 to the closed position. A handle $D^{11}$ may be bent as at $D^{14}$ so that it lies generally along the housing D and in the direction of the hose connection.

Although I have shown in my drawings an operative form of tool for carrying out my method, it is obvious that many changes in form, shape and arrangement of parts may be made without departing from the spirit of my invention. Particularly it is to be understood that any apparatus of proper size, by means of which fluid can be used to form an opening or a hole downwardly along the root of a plant, and by means of which the effect and pressure of the fluid may be localized and used to separate the root of the plant from the surrounding soil, may be used to carry out the method of my invention.

The method herein described is carried out as follows:—

With the tool as shown connected to a source of fluid preferably under pressure, the operator will take the tool and insert the tubular point in the soil close to the root of a plant which is to be removed. The point is forced progressively into the ground either while the fluid is turned on or before it is turned on. In any event, the fluid is used while the tube is in the ground, sometimes while the tool is stationary, sometimes while it is being thrust into the ground and sometimes while it is being moved up and down in the ground. In a very short time the fluid has washed the roots of the plants free of soil and the plant may be pulled out since its roots no longer hold it to the soil. By this means with a minimum of disturbance to the surrounding soil and growth, the plant which